Nov. 30, 1965    S. E. FAREKAS    3,220,289
INTERMEDIATE SHAFT SUPPORT BEARING
Filed April 24, 1963    2 Sheets-Sheet 1
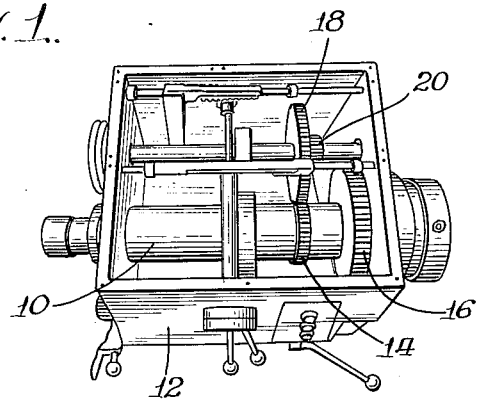
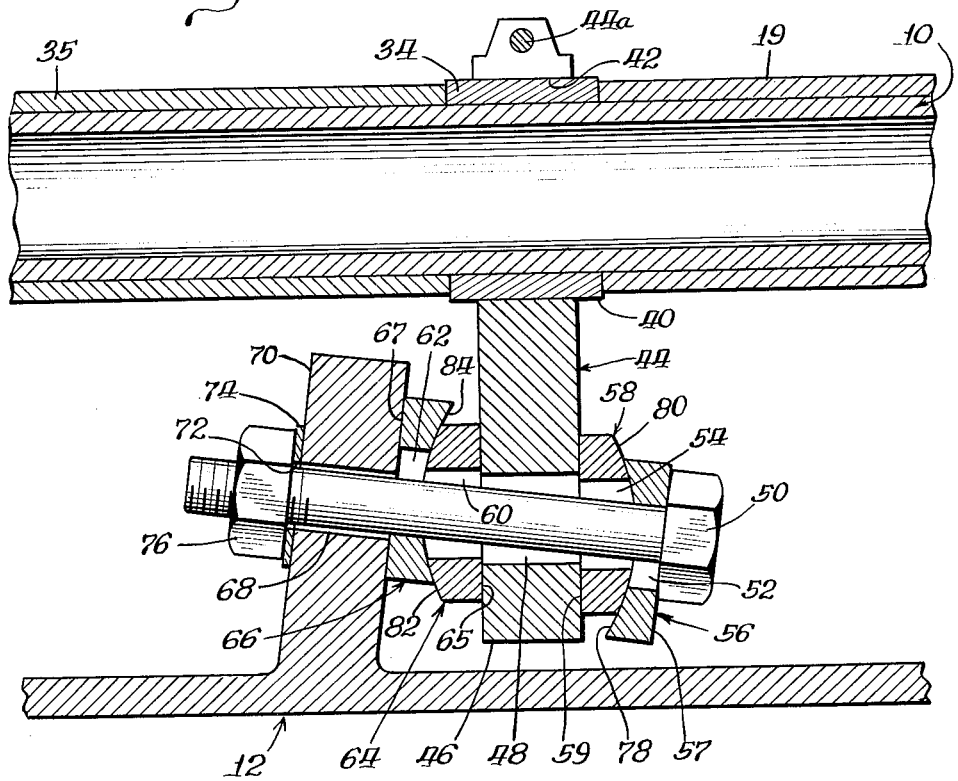

Nov. 30, 1965 S. E. FAREKAS 3,220,289
INTERMEDIATE SHAFT SUPPORT BEARING
Filed April 24, 1963 2 Sheets-Sheet 2
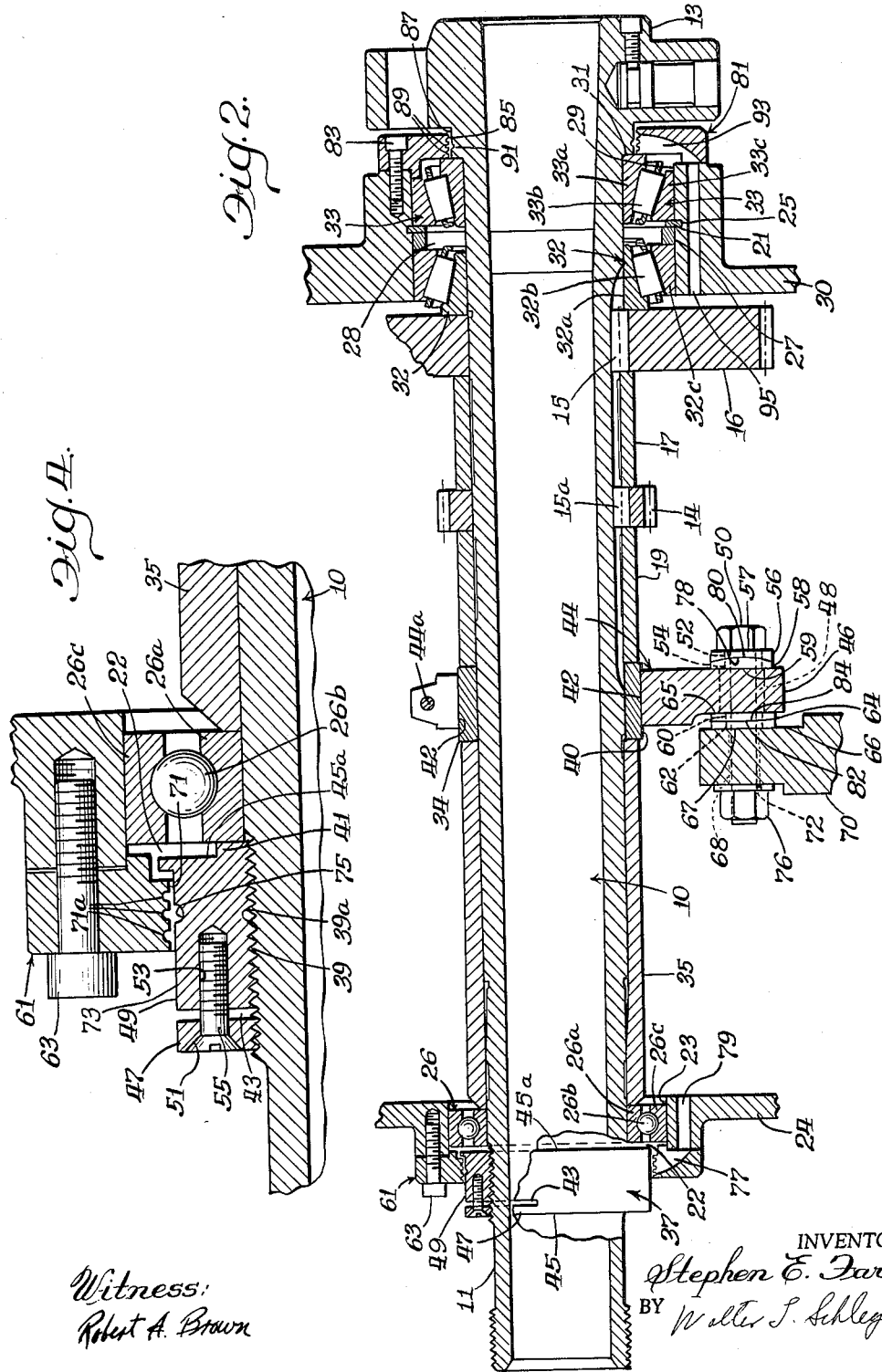
INVENTOR.
Stephen E. Farekas
BY Walter S. Schlegel, Jr.
Atty.
Witness:
Robert A. Brown United States Patent Office 3,220,289
Patented Nov. 30, 1965

3,220,289
INTERMEDIATE SHAFT SUPPORT BEARING
Stephen E. Farekas, South Bend, Ind., assignor to Amsted Industries Incorporated, Chicago, Ill., a corporation of New Jersey
Filed Apr. 24, 1963, Ser. No. 275,434
4 Claims. (Cl. 82—30)

This invention relates generally to machine tools and more particularly to placement and adjustment of assembled component parts about a lathe spindle and to the supplemental support of the spindle with a head stock of a lathe.

In the past it has been common practice to support a lathe spindle by means of any of several combinations of journalled arrangements. The purpose of such spindle bearing supports is, for course, to maintain accurate and stable alignment of the rotating spindle. In order to maintain the spindle within proper alignment more than two bearing supports must be used. For example, an adjustable bearing is usually located at a convenient point between the end bearing supports. An intermediate bearing support of this type requires considerable mechanical adjustment in order to prevent the development of excessive torque or harmonic motion. A procedure of this type involves considerable use of labor man-hours by highly skilled lathe mechanics. This, of course, is expensive and does not provide a complete assurance that the job will be accomplished in identical fashion on different lathes or in the same manner at another time on the same lathe.

Also, it is usual to locate a series of abutting parts about the spindle such as gears, spacers, and bushings. It is, of course, necessary to secure these component parts to the spindle so that they will rotate simultaneously with the spindle. Further, in order to ensure that these assembled parts are secured properly to the spindle, each part must be attached individually or the entire assembly must be fixed to the spindle in some special manner.

Accordingly, an object of this invention is to provide a novel means to secure various machine elements about a lathe spindle so that rotative motion will be accomplished therewith.

A further object of this invention is to secure various machine elements about a lathe spindle by an adjustable means accessible from without the lathe headstock housing the spindle.

An additional object of this invention is to provide a mechanical means to properly position and place an intermediate spindle bearing support within a headstock of a lathe.

Another object is to provide a self-positioning mechanism which will properly align itself with a spindle within a headstock of a lathe.

A further object is to provide auxiliary support along the span of a lathe spindle between its main bearing supports.

An additional object is to provide a spindle supporting mechanism which will dampen the tendency of a rotating spindle to develop harmonic motion in other component parts of a lathe.

Other objects and advantages of this invention will become apparent when reference is made to the following written description considered in conjunction with the accompanying drawings wherein:

FIGURE 1 is a perspective view of the headstock of a lathe, with its top cover plate removed, showing the spindle located therein;

FIGURE 2 is a fragmentary cross-sectional view of the headstock illustrated in FIGURE 1 taken generally on a horizontal plane passing through the axis of the spindle;

FIGURE 3 is a fragmentary sectional view illustrating, in exaggerated form, the spherical washer connection arrangement between the mounting and clamping brackets; and FIGURE 4 is an enlarged, fragmentary sectional view showing detail of the spindle nut adjusting and locking arrangement located near one end of the spindle.

Certain details have been omitted from the drawings for purposes of clarity.

Referring to FIGURE 1, a steel spindle 10 is journaled within a headstock housing 12. A plurality of gears 14 and 16, secured rigidly to said spindle, receive rotative motion through selective engagement with a plurality of driving gears 18 and 20 actuated by a suitable power source.

Referring to FIGURES 2, 3 and 4, said spindle 10 extends through an opening 22 of a wall 24 of said headstock housing 12. One end 11 of said spindle is journaled within a ball bearing asembly 26. Said bearing assembly is comprised of an inner race 26a, a plurality of roller balls 26b, and an outer race 26c. Said inner race is secured to spindle 10 as by being compressed between adjacent abutting members, and said outer race remains in stationary contact with a peripheral wall 23 of said opening 22 of housing 12. Rolling contact between said balls and said inner and outer races journals said one end of the spindle for rotation as driven by said power source.

The other end 13 of spindle 10 extends through an opening 28 formed in a wall 30 oppositely disposed from wall 24 of housing 12. Tapered roller bearing assemblies 32 and 33 are located about said spindle and serve to journal the spindle within said opening 28. Said tapered bearing assemblies 32 and 33 are comprised of inner races 32a and 33a, cylindrical rollers 32b and 33b, and outer races 32c and 33c, respectively. Said inner races are secured to spindle 10, as by being compressed between adjacent abutting members, and said outer races remain in stationary contact with a peripheral wall 29 of said opening 28 of housing 12. Rolling contact between said cylindrical rollers and said inner and outer races journals said other end of the spindle for rotation as driven by said power source.

A circumferential shoulder 31 is formed on spindle 10 near said other end 13. Said shoulder has a diameter substantially larger than the nominal diameter of the spindle. One side of said tapered bearing 33 abuts said shoulder. An internal ring 21 is received in a recess 25 of said peripheral wall 29 so that it will abut said bearing 33 and maintain it against said shoulder 31. A spindle bearing spacer 27 is located about said spindle so that its outer periphery contacts said peripheral wall 29 and its inner diameter is of a size considerably larger than the nominal diameter of said spindle. Said spacer is positioned in abutting contact between said ring 21 and said tapered bearing 32.

Said gear 16 is secured to spindle 10 as by a key 15 and is axially positioned thereon in abutting contact with said inner race 32a of tapered bearing 32. A generally cylindrical first spacer 17 is located about the spindle in slideable fit thereon so that one end abuts the gear 16. Said gear 14 is secured to spindle 10 as by a key 15a and is axially positioned thereon in abutting contact with said first spacer 17. A generally cylindrical second spacer 19 is located about the spindle in slideable fit thereon so that one end abuts the gear 14.

Intermediate the ends of said spindle 10 a generally cylindrical bushing or sleeve bearing 34 formed of friction bearing material, such as brass, is located about the spindle in slideable contact thereon so that one end abuts said second spacer 19. A generally cylindrical third spacer 35 is located about said spindle in slideable contact thereon so that one end abuts said bushing and the other end abuts said ball bearing assembly 26.

A generally cylindrical spindle nut 37 is secured to said end 11 of said spindle 10 as by internal threads 39 engaging external threads 39a of the spindle. Said nut is threaded on to said spindle a sufficient amount so that an annular extension 41 abuts said inner race 26b of ball bearing assembly 26.

It will be noted that said nut when tightened exerts pressure against the several component parts mentioned heretofore as being located about said spindle. As said nut is continued to be tightened, said parts are urged together in an axial direction toward said shoulder 31. Said shoulder acts to resist the axial movement of said parts caused by tightening the nut 37 and a compressive force is set up in said parts. The nut 37 is continued to be tightened until a predetermined compressive force is set up throughout said parts between said nut and said shoulder. As a result said parts are secured to said spindle so that they are integrally assembled components and rotate with the spindle as a unitary machine member.

A locking arrangement for said spindle nut is comprised generally of an arcuate slot 43 formed substantially transversely through said nut. Said slot is spaced inwardly from an outer end surface 45 of said nut and an outer split portion 47 of said nut is formed therebetween. Said locking arrangement also comprises an inner split portion 49 of said nut formed between an inner end surface 45a and said slot 43. At least one counter sunk opening 51 is formed through said outer split portion 47 near the periphery of said nut. Said opening is axially aligned with an internally threaded recess 53 formed in said inner split portion 49. A machine screw 55 extends through said opening 51 and threadably engages said threaded recess 53. As said screw 55 is tightened, said outer split portion 47 and said inner split portion 49 are caused to move closer to each other. This movement in turn causes the internal threads 39 of said nut 37 to squeeze against the threads 39a of the spindle and hold the nut in locked engagement with the spindle. It will be noted that said nut is placed in locked engagement with said spindle after said nut has been threaded upon said spindle a sufficient amount to cause the several parts assembled thereon to be subject to a desired compressive force that ensures their integral rotation with the spindle.

It will be also noted that said spindle nut 37 is located outside said housing 12 and is accessible for adjustment and disassembly without having to gain access to the internal mechanism of the housing. It is therefore possible to adjust said tapered bearings 32 and 33 within said opening 28 and about said spindle and to seat said bearings against said shoulder 31 of said spindle by an inexpensive and novel arrangement of exterior manipulation of the spindle nut.

A generally cylindrical spindle end cap 61 is located about said spindle nut 37 and is secured to said wall 24 of the housing 12 as by a plurality of cap screws 63. Said end cap has an inner cylindrical surface 71 located generally about the outer cylindrical surface 73 of said nut. Said inner surface 71 may be serrated as at 71a, 71a and complementally forms an oil seal with said outer surfaces 73 of said nut. An annular groove 75 is formed in said outer surface 73 of said nut and serves as means to drain oil into a receiving recess 77 formed in a lower portion of said end cap 61. An opening 79 formed through the wall 24 of the housing communicates with said receiving recess 77 and provides means whereby oil drains into said housing.

In a similar manner, a generally cylindrical nose cap 81 is located about said circumferential shoulder 31 of said spindle 10 and is secured to said wall 30 of the housing 12 as by a plurality of cap screws 83. Said nose cap has an inner cylindrical surface 85 located generally about an outer cylindrical surface 87 of said shoulder 31. Said inner surface 85 may be serrated as at 89, 89, and complementally forms an oil seal with said outer surface 87 of said shoulder 31. An annular groove 91 is formed in said outer surface 87 of said shoulder 31 and serves as means to drain oil into a receiving recess 93 formed in a lower portion of said nose cap 81. An opening 95 formed through the wall 30 of the housing communicates with said receiving recess 93 and provides means whereby oil drains into said housing.

Intermediate the ends of the spindle 10, as best viewed in FIGURE 3, an annular split clamping or bearing bracket 44 is located about said bushing 34 so that an outer diameter 40 thereof is slideably received within an inner diameter 42 of said clamping bracket. An extension 46 formed on clamping bracket 44 is provided with a hole 48 for the reception of a bolt 50 therethrough.

Said bolt 50 extends longitudinally through apertures 52 and 54 formed within spherical washers 56 and 58, respectively, through hole 48 of extension 46, through apertures 60 and 62 formed within spherical washers 64 and 66 respectively, and through a loosely accommodating hole 68 located within a mounting bracket 70 fixed to the housing 12. The bolt 50 also extends through an aperture 72 of a washer 74 and is threadably engaged with a hex nut 76. Said spherical washer 56 is formed to provide a flat surface 57 and an arcuate surface 78. Said spherical washer 58 is formed to provide a flat surface 59 and an arcuate surface 80 that is substantially complementary with said surface 78. Said surface 78 and said surface 80, being abuttably adjacent, tend to slide upon each other when compressive force is exerted against flat surfaces 57 and 59 of said washers 56 and 58.

Similarly, said spherical washer 64 is formed to provide a flat surface 65 and an arcuate surface 82. Said washer 66 is formed to provide a flat surface 67 and an arcuate surface 84 that is substantially complementary with said surface 82. Said surface 82 and surface 84, being abuttably adjacent, tend to slide upon each other when compressive force is exerted against flat surfaces 65 and 67 of said washers 64 and 66. As hex nut 76 is rotated in a clockwise direction, a compressive force is exerted upon the aforementioned members located between the head of said bolt 50 and said hex nut 76, and causes said members to squeeze closely against one another. As said compressive force is continued and increased, the complementary arcuate surface 78 and 80, and 82 and 84 of said spherical washers 56 and 58, and 64 and 66, respectively, slide upon each other.

The sliding movement between said arcuate surfaces continues until said clamping bracket 44 is secured rigidly to mounting bracket 70 fixed to housing 12. Mounting bracket 70, fixed to housing 12, is not likely to be in parallel relationship with clamping bracket 44. Thus, the sliding movement that occurs between arcuate surfaces of the spherical washers, when nut 76 is tightened on bolt 50, adjusts and compensates for any lack of parallel relationship that may be present between the mounting bracket 70 and the clamping bracket 44. Therefore, a rigid arm-like structure is formed comprising bracket 70, bolt 50, nut 76, clamping bracket 44, spherical washers 56, 58, 64, 66, and serves to provide an intermediate bearing support for spindle 10.

In operation of the lathe, the bearing 34 rotates with the spindle 10 to permit use of a bearing 34 having a minimum diameter and to accommodate adjustment of the roller bearings 32 and 33 by the nut 37 as heretofore described. It has also been discovered that, in this novel combination of elements, the bearing 34, which is snugly engaged with the bracket 44 by a bolt 44a, provides better vibration damping of the spindle 10 than a prior art ball or roller bearing.

Although but one embodiment of the invention has been disclosed and described herein, it is apparent that other embodiments and modifications are possible without the scope of the appended claims.

I claim:
1. A lathe comprising a headstock housing, a spindle journaled near its ends in oppositely disposed walls of said housing, a shoulder formed on said spindle at one end thereof and near one of said journal points, a first bearing having an outer race fitted within a first opening of said housing and located about said spindle, said bearing having an inner race which is fitted on said spindle and which has an outer end in abutting contact with said shoulder, an internal ring located about said spindle and received by a recess formed within the periphery of said first opening, said ring having a surface facing the shoulder and in abutting contact with said outer race at its inner end, a bearing spacer located about said spindle within said first opening and being positioned in abutting contact with said internal ring, a second bearing having an outer race received within said first opening and located about said spindle and being positioned thereon in abutting contact with said bearing spacer at the inner end of said last-mentioned race, said second bearing having an inner race fitted on said spindle, each of said bearings having rollers between its races, the rollers of respective bearings tapering toward each other, a plurality of gears located about and keyed on said spindle for slideable movement lengthwise thereof, a plurality of spindle spacers located slideably fitted on said spindle, certain of said spacers spacing said gears, said gears and spacers being positioned in abutting contact with one another and with said last mentioned race, a ball bearing assembly received within a second opening in said housing and located about said spindle and having an inner race slideably fitted thereon in abutting contact with one of said spindle spacers, and a spindle nut located about and threadably engaging a portion of said spindle, said nut having abutting contact with said ball bearing inner race, said nut being effective when tightened to clamp the spindle spacers and inner races between the nut and shoulder of the spindle for unitary rotation therewith, one of said spindle spacers being a nonferrous bearing, and a bracket slideably fitted around said nonferrous bearing and supported by the housing.

2. A lathe comprising a headstock housing, a spindle journaled within said housing, a ball bearing assembly located in said housing supporting one end of said spindle, a tapered roller bearing assembly located in said housing supporting the other end of said spindle, a generally cylindrical bushing positioned about and secured to said spindle at a point intermediate said ends, a clamping bracket located about said bushing, an inner diameter formed through said bracket slideably receiving the outer diameter of said bushing to accommodate rotative motion therebetween, and a clamping means attached to said bracket comprising a bolt extending through a first opening in said bracket, and a second opening in a mounting bracket rigidly secured to the housing, a first pair of washers on said bolt between the head of said bolt and one side of said clamping bracket, a second pair of washers on said bolt between the other side of said clamping bracket and one side of said mounting bracket, each of said washers being formed to provide at one axial end thereof a flat surface substantially perpendicular to its axis and at its other end a spherical surface having its center of generation located on the longitudinal axis of said bolt, said spherical surfaces being so formed that in each of said pairs of washers one of said washers has a concave spherical surface and the other washer has a convex spherical surface in mating relationship with the concave surface, and a nut threadably engaging said bolt on the other side of said mounting bracket, said mating surfaces being disposed to slide with respect to each other when axial compressive force is exerted against the flat surfaces by said nut and bolt.

3. A lathe comprising a headstock housing, a spindle journaled near its ends in oppositely disposed walls of said housing, an abutment member formed on said spindle near one end thereof, a first bearing member secured in one of said walls and positioned about said spindle in relative rotatable contact therewith and in abutting contact with said abutment member, a plurality of gears located about and secured to said spindle, a plurality of generally cylindrical spacing members located about said spindle spacing said gears, said gears and spacing members being positioned about said spindle in abutting contact with one another and with said first bearing member, a second bearing member located in the other of said walls and positioned about said spindle in relative rotatable contact therewith and in abutting contact with one of said spacing members, a spindle nut located about and threadably engaging a portion of said spindle exterior of said housing, said nut being threaded a sufficient amount upon said spindle so that abutting contact is achieved with said second bearing member and the abutting members positioned about said spindle are urged against said abutment member and rotate as a unit with said spindle, a clamping bracket secured about another of said spracing members positioned intermediate said ends in relative rotational contact therewith, a mounting bracket secured to said housing, a bolt and washers and nut assembly connecting said clamping bracket to said mounting bracket, said nut being effective when tightened on said bolt to cause said washers to adjust with each other so that said clamping bracket is secured to said mounting bracket and acts as an intermediate bearing support for said spindle.

4. A machine comprising a housing, a spindle journaled near its opposite ends in said housing, a clamping bracket located about said spindle in a manner allowing relative rotational motion therebetween, and having a predetermined position of alignment relative to the spindle, a fixed mounting bracket on the housing adjacent the clamping bracket, the brackets having surfaces facing generally toward each other, and securing means rigidly interconnecting the brackets having elements respectively engaging said surfaces of the brackets and including self-adjusting means to accommodate misalignment between those surfaces and maintain the clamping bracket in its said predetermined position.

References Cited by the Examiner

UNITED STATES PATENTS

| | | | |
|---|---|---|---|
| 171,898 | 1/1876 | Wiles | 151—21 |
| 2,109,766 | 3/1938 | Bullard | 82—30 |
| 2,111,869 | 3/1938 | Montgomery | 82—30 X |
| 2,417,936 | 3/1947 | Klema et al. | 82—30 |
| 2,545,858 | 3/1951 | Pesqueira et al. | 82—30 |

FOREIGN PATENTS

| | | |
|---|---|---|
| 13,274 | 6/1906 | Great Britain. |
| 18,633 | 4/1909 | Great Britain. |
| 283,075 | 1/1928 | Great Britain. |

WILLIAM W. DYER, Jr., *Primary Examiner.*